(12) United States Patent
von Düring

(10) Patent No.: US 6,803,145 B1
(45) Date of Patent: Oct. 12, 2004

(54) FLAT LITHIUM CELL

(75) Inventor: Bodo von Düring, Lucerne (CH)

(73) Assignee: Elion AG, Lucerne (CH)

( * ) Notice: Subject to any disclaimer, the term of this patent is extended or adjusted under 35 U.S.C. 154(b) by 0 days.

(21) Appl. No.: 10/049,740

(22) PCT Filed: Jun. 7, 2001

(86) PCT No.: PCT/CH01/00354
§ 371 (c)(1),
(2), (4) Date: Jul. 16, 2002

(87) PCT Pub. No.: WO01/97299
PCT Pub. Date: Dec. 20, 2001

(51) Int. Cl.$^7$ .............................. H01M 2/08; H01M 2/14
(52) U.S. Cl. ....................... 429/174; 429/162; 429/429; 429/176; 429/144
(58) Field of Search ............................. 429/176, 162, 429/144, 174, 254

(56) References Cited

U.S. PATENT DOCUMENTS 3,997,365 A   12/1976  Feldhake
4,321,316 A   3/1982   Kühl
4,548,880 A   10/1985  Suzuki et al.
5,612,153 A * 3/1997   Moulton et al. ........ 429/162 X
2003/0059673 A1 * 3/2003 Iangan et al. ............... 429/127

OTHER PUBLICATIONS

Patent Abstracts of Japan, vol. 9, No. 185, JP 60 054173, Jul., 1985.

* cited by examiner

Primary Examiner—John S. Maples
(74) Attorney, Agent, or Firm—Beyer Weaver & Thomas, LLP

(57) ABSTRACT

Lithium flat battery consisting of a first housing part accommodating a first thin-layer electrode, a second housing part accommodating a second thin-layer electrode, and a separator placed between the electrodes, wherein the housing parts of the battery are built of electrically conductive, wherein the separator presents electrically insulating sealing and bonding material in the area where both housing parts are in contact with each other and wherein the housing parts are united by the sealing and bonding material on the separator thus forming through him a closed housing.

22 Claims, 2 Drawing Sheets

FLAT LITHIUM CELL

The present invention relates to a lithium flat battery comprising of a first housing part accommodating a first thin-layer electrode, a second housing part accommodating a second thin-layer electrode, and a separator located between the electrodes. Batteries of this type are known in particular from U.S. Pat. No. 5,558,957 and EP patent 862,227.

U.S. Pat. No. 5,558,957 describes a battery where the electrodes and the separator are placed inside a complex housing having a special frame and multi-layered electrical connector tabs. The complexity of the housing leads to a multitude of bonding connections in multiple layers and directions making stability and conductivity of this known cell questionable.

EP Patent 862,227 describes a cell of the kind mentioned above in which the design appears to be simpler but at the price that the electrical connector tabs of the electrodes pass through a film enclosing the complete housing, thus creating leakage problems. To avoid these leakage problems, this known proposition suggests a web-structure for the electrical tabs. This, however, has negative effects on the efficiency of the electrical tabs and their mechanical strength.

DE 3122 2658 describes a battery where the separator extends into an area between housing cup and housing lid of the battery with an additional seal placed between cup and lid. In this solution the cup is a very stable and stiff part in order to absorb forces during flanging of the cup borders over the cover. These flanging forces harmful for the separator are absorbed notably by a strengthening rim of the cup. For this reason the battery described is intentionally stiff and relatively heavy with an excessive amount of material and a complicated design.

U.S. Pat. No. 5,714,283 describes a pancake-like multi-layered battery where the separator extends into an area between the housing bottom an the housing cover but without having any bonding or sealing function. To the contrary, a special sealing compound and a fastening ring separately ensure these functions, thus generating a complex design.

U.S. Pat. No. 5,800,944 describes a button or coin cell battery where the separator extends between housing cup and housing lid in order to be wedged there during the flanging process. For this purpose the peripheral edge of the separator is folded or bent several times with the consequence that, during flanging, several peripheral areas of the separator are exposed to the necessary high flanging forces and possible damaging. Furthermore the geometry of the cell results in an essentially stiff body. The risk of damage during flanging is reduced by a sealing material placed at the flanging perimeter of the cell, possibly separating completely the separator from the sealing material. Altogether there is a complex design including, in particular, leakage caused by the flanging process.

The object of the present invention is to propose a flat battery
- wherein the separator itself assumes a central supporting function,
- the number of components is minimal combined in a simple assembly,
- no leakage problems occur with optimal efficiency of the electrical connector tabs,
- possible use in electronic cards, as for instance in so-called smart cards.

In order to meet these objects the invention suggests that the housing parts of the battery are built of electrically conductive, that the separator presents electrically insulating sealing and bonding material in the area where both housing parts are in contact with each other and that the housing parts are united by the sealing and bonding material on the separator thus forming through him a closed housing.

By this simple design, the housing parts can be realized as electrical tabs and the separator carries the sealant material for connecting the two housing parts and, at the same time, is the supporting and connecting element. Therefore the battery according to the invention is particularly suitable for installation in data-carrying systems having the thickness of plastic cards.

According to a preferred embodiment of the invention, the film building the battery housing as a metallic film. This realization eliminates the need for a separate film as in EP 862.227 and the related leakage problems.

Further details and characteristics of the invention result from the following description in connection with the attached drawings of possible embodiments of the invention. In these drawings.

Figure 1:
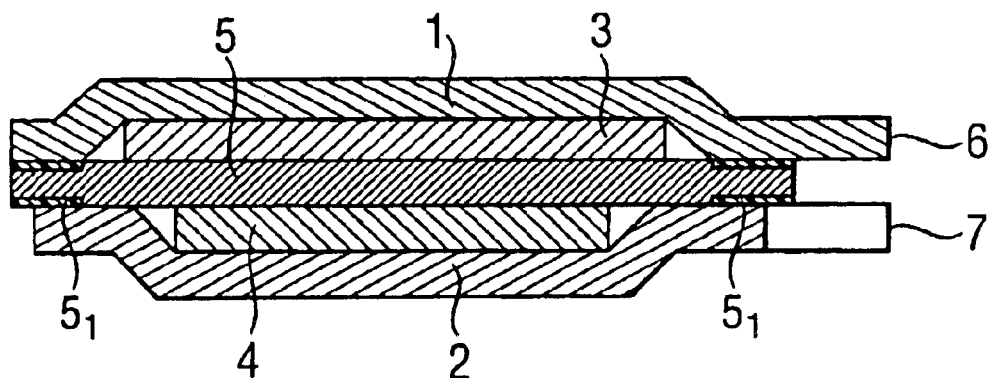
FIG. 1 is a schematic cross-section of a flat battery according to the invention.

The flat battery shown schematically and according to the invention comprises a first housing part 1 the size of which determines the size of the battery. This housing part 1 can present any appropriate or desired shape. On its inner side this housing part 1 accommodates a first electrode 3 (cathode) made from an active material intercalating lithium ions, such as transient metal oxides (Manganese-Oxide, Lithium-Cobalt-Oxide or the like).

The second battery housing part 2 carries the second electrode 4 (anode) made from electrochemically active material as e.g. lithium-foil or graphite and is located opposite the housing cover with the separator 5 positioned between them. The peripheral rim of housing part 2 is preferably smaller than that of housing part 1. The separator 5, made from a foil containing electrolyte, comprises an electrically insulating bonding and sealing material $5_1$ along its edge, specifically at the areas of contact between housing parts 1 and 2.

Figure 3:
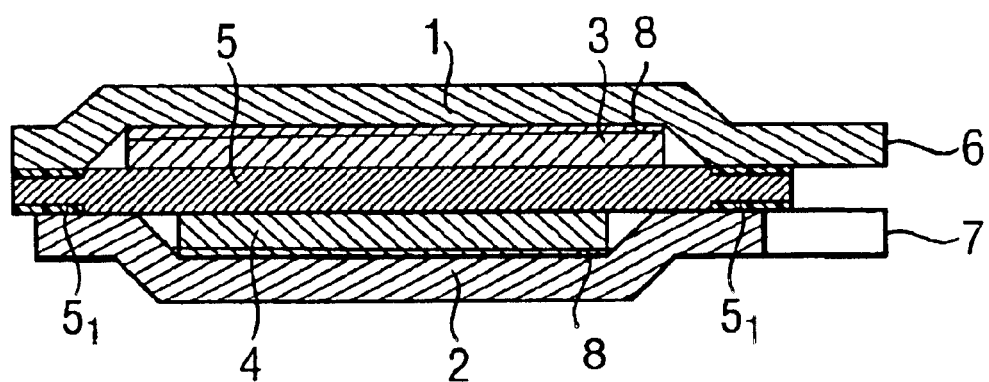
FIG. 3 is a schematic cross-section of an embodiment of the flat battery shown in FIG. 1.

In order to improve the bonding properties and to reduce the transition resistance, the inside of at least one of housing parts 1, 2 is coated with an electrically conductive bonding material 8 in the area where the electrode 4, 5 are supported, such as illustrated in FIG. 3.

According to the invention it is advantageous that foils forming the housing parts 1, 2 are metal foil made form copper, aluminum, titanium, or high-grade steel presenting a thickness between 12 $\mu$m and 50 $\mu$m, and preferably between 15 $\mu$m and 25 $\mu$m.

The sealing material $5_1$ on the separator 5 ensuring connection and sealing of the two housing parts 1 and 2 comprises a polymer foil sealing the housing parts 1, 2 at temperatures between 80 and 130° C. The sealing material $5_1$ preferably comprises a multiple layers structure of modified polymers as e.g. polypropylene, polycarbonate, or polyethylene terephthalate. The two housing parts 1, 2 are particularly well bonded together by the sealing material $5_1$ when sealed under vacuum at 90 to 145° C. and under atmospheric pressure of 5 to 200 mbar, preferably at 50 mbar. Without leaving the scope of the invention sealing of the two housing parts 1, 2 by means of the sealing material $5_1$ can also be carried out by means of ultra-sonic systems and under vacuum.

The cross section shows that the separator 5 and its bonding and sealing material 5₁ slightly extend over the peripheral rim of the second housing part 2 in order to assure proper insulation of the battery housing parts 1, 2 acting as electrodes. The offset of the sealing material $5_1$ on the separator 5 is especially provided at the position where the electrical connector tabs 6, 7 of both housing parts 1, 2 are positioned.

According to the invention it is advantageous but not necessarily required that housing part 1 has a larger surface extent than the rim of housing part 2 and, therefore, extends over the periphery of housing part 1 all around.

The total thickness of the of the battery comprising housing parts 1, 2 and the separator 5 is significantly less than 1 mm, preferably less than 0.4 mm. Consequently, the flat battery according to the invention can be particularly well integrated in electronic cards. Without leaving the scope of the invention, it is self-evidently possible to weld the flat battery according to the invention integrated in a data carrier card not shown by means of a cover film or to weld the flat battery into or cover it by a protective film.

The flat battery according to the invention is not limited to the measurements and proportions shown as embodiments. These are only provided for a better understanding of the idea of the invention. The flat battery according to the invention presents the major advantages, as compared to batteries of the prior art mentioned above, of simplicity of design, mechanical robustness of the electrical tabs and highly efficient sealing of the housing without disturbing passages especially in the sealing area and detrimental for he mechanical stability. Therefore the flat battery according to the invention generally excels by a high mechanical stability and highly efficient electrical connectivity. The design according to the invention allows for batteries with very good flex and kink properties of the electrical tabs 6, 7. This battery therefore is very suitable for use in a mechanically demanding environment without compromising on its overall efficiency. The realization of the separator as carrier for the sealing material for connecting the housing parts of the battery drastically simplifies the battery design.

Figure 2:
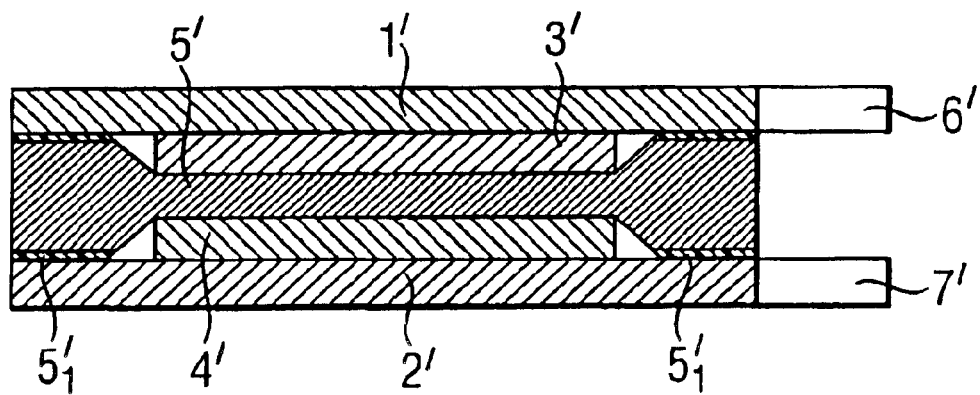
FIG. 2 is a schematic cross-section of another embodiment of the flat battery according to the invention.

FIG. 2 depicts another embodiment of a battery structure according to the invention. Here, the separator 5' seen in a cross section has the shape of a bone so that the separator 5' essentially presents the shape of a waffle comprising a surrounding rim and a recess for receiving the electrodes 3, 4 on both sides of it. The rim of the separator 5' carries the sealing and bonding material $5_1'$. This material can be a separate film or an integral part of the separator rim. The housing parts 1' and 2' are positioned plane on the separator 5', respectively its peripheral rim $5_1'$. This design provides a geometrically simple battery where the connector tabs 6' and 7' are clearly distant from each other, while, at the same time, the separator 5' with its peripheral rim provides an excellent basic structure for the mechanical stability of the overall battery. Through this waffle structure the separator 5' is particularly well suited as a central carrier for the battery structure altogether. It is advantageous, in this context, if the body of the battery built up by the separator and the housing parts is jacketed by a protective and insulating coating.

What is claimed is:

1. A lithium flat battery consisting of a first housing part accommodating a first thin-layer electrode, a second housing part accommodating a second thin-layer electrode, and a separator placed between the electrodes, characterized by the fact that the housing parts of the battery are built of electrically conductive film, that the separator presents electrically insulating sealing and bonding material in the area where the housing parts contact the separator and that the housing parts are united by the sealing and bonding material on the separator so as to form a closed housing.

2. A lithium flat battery according to claim 1 wherein the film building the housing parts is a metallic film.

3. A lithium flat battery according to claim 2 wherein the inside of at least one of the two battery parts is coated in the area accommodating the thin-layer electrodes with an electrically conductive bonding material.

4. A lithium flat battery according to claim 1 wherein the inside of at least one of the two battery parts is coated in the area accommodating the thin-layer electrodes with an electrically conductive bonding material.

5. A lithium battery according to claim 1 wherein the contact areas on one of the housing parts are larger than those on the corresponding other housing part and wherein the sealing material on the separator covers the larger contact areas.

6. A lithium flat battery according to claim 5 wherein the film building the housing parts is a metallic film.

7. A lithium flat battery according to claim 5 wherein the inside of at least one of the two battery parts is coated in the area accommodating the thin-layer electrodes with an electrically conductive bonding material.

8. A lithium flat battery according to claim 1 wherein the films building the battery parts present, at least on one side, a layer of electrolytically deposited copper particles.

9. A lithium flat battery according to claim 8 wherein the film building the housing parts is a metallic film.

10. A lithium flat battery according to claim 8 wherein the inside of at least one of the two battery parts is coated in the area accommodating the thin-layer electrodes with an electrically conductive bonding material.

11. A lithium battery according to claim 8 wherein the contact areas on one of the housing parts are larger than those on the corresponding other housing part and wherein the sealing material on the separator covers the larger contact areas.

12. A lithium flat battery according to claim 1 wherein the sealant on the separator outreaches over the edge of the film building at least one of the housing parts of the battery at least in the area where electrical connector tabs are located.

13. A lithium flat battery according to claim 12 wherein the film building the housing parts is a metallic film.

14. A lithium flat battery according to claim 12 wherein the inside of at least one of the two battery parts is coated in the area accommodating the thin-layer electrodes with an electrically conductive bonding material.

15. A lithium battery according to claim 12 wherein the contact areas on one of the housing parts are larger than those on the corresponding other housing part and wherein the sealing material on the separator covers the larger contact areas.

16. A lithium flat battery according to claim 12 wherein the films building the battery parts present, at least on one side, a layer of electrolytically deposited copper particles.

17. A lithium flat battery according to claim 1 wherein the separator presents the shape of a waffle comprising a peripheral rim and depressions accommodating the electrodes.

18. A lithium flat battery according to claim 17 wherein the film building the housing parts is a metallic film.

19. A lithium flat battery according to claim 18 wherein the inside of at least one of the two battery parts is coated in the area accommodating the thin-layer electrodes with an electrically conductive bonding material.

20. A lithium flat battery according to claim 1 wherein the battery body built by the housing parts and the separator, but excluding the electrical connector tabs, is covered with an electrically insulating protective coating.

21. A lithium flat battery according to claim 20 wherein the inside of at least one of the two battery parts is coated in the area accommodating the thin-layer electrodes with an electrically conductive bonding material.

22. A lithium flat battery according to claim 21 wherein the film building the housing parts is a metallic film.

* * * * *

UNITED STATES PATENT AND TRADEMARK OFFICE
CERTIFICATE OF CORRECTION

PATENT NO. : 6,803,145 B1  Page 1 of 1
DATED : October 12, 2004
INVENTOR(S) : Bodo von Düring It is certified that error appears in the above-identified patent and that said Letters Patent is hereby corrected as shown below:

<u>Title page,</u>
Insert the following item:
-- [30]     Foreign Application Priority Data

June 14, 2000   [CH]   Switzerland............... 1192/00 --

Signed and Sealed this

Nineteenth Day of April, 2005

JON W. DUDAS
*Director of the United States Patent and Trademark Office*